(12) United States Patent
Wu et al.

(10) Patent No.: US 8,184,848 B2
(45) Date of Patent: May 22, 2012

(54) LIQUID LEVEL DETECTION METHOD

(75) Inventors: Jyh-Hong Wu, Taichung (TW);
Fang-Pang Lin, Hsinchu (TW); Yi-Hao Hsiao, Shetou Township, Changhua County (TW); Te-Lin Chung, Jhubei (TW)

(73) Assignee: National Applied Research Laboratories, Taipei (TW)

( * ) Notice: Subject to any disclaimer, the term of this patent is extended or adjusted under 35 U.S.C. 154(b) by 562 days.

(21) Appl. No.: 12/486,220

(22) Filed: Jun. 17, 2009

(65) Prior Publication Data

US 2010/0322462 A1 Dec. 23, 2010

(51) Int. Cl.
*G06K 9/00* (2006.01)
(52) U.S. Cl. .......................................... 382/100; 73/1.73
(58) Field of Classification Search .................. 382/100, 382/103, 106; 73/1.31, 1.73, 170.34; 348/160
See application file for complete search history.

(56) References Cited

U.S. PATENT DOCUMENTS

| | | | | |
|---|---|---|---|---|
| 5,427,161 | A * | 6/1995 | Luhmann et al. | 141/144 |
| 6,098,029 | A * | 8/2000 | Takagi et al. | 702/127 |
| 7,733,376 | B2 * | 6/2010 | An | 348/207.99 |
| 2005/0271266 | A1 * | 12/2005 | Perrier | 382/157 |
| 2006/0178578 | A1 * | 8/2006 | Tribble et al. | 600/432 |
| 2007/0217773 | A1 * | 9/2007 | Droubie | 396/25 |
| 2008/0305012 | A1 * | 12/2008 | Camenisch | 422/100 |
| 2009/0067669 | A1 * | 3/2009 | Kojima | 382/100 |
| 2009/0109057 | A1 * | 4/2009 | Lenger | 340/870.07 |
| 2009/0173409 | A1 * | 7/2009 | Ozanne et al. | 141/1 |

FOREIGN PATENT DOCUMENTS

| | | | |
|---|---|---|---|
| FR | 2865802 A1 | | 8/2005 |
| JP | 7098238 | | 4/1995 |
| JP | 2001082997 A | * | 3/2001 |
| JP | 2001133311 A | | 5/2001 |
| JP | 2002031562 A | | 1/2002 |
| JP | 2003149032 A | | 5/2003 |
| WO | 2007032595 A1 | | 3/2007 |

OTHER PUBLICATIONS

Intellectual Property Office, International Search Report—Application No. GB0909480.6, dated Oct. 29, 2009 (4 pages).

* cited by examiner

*Primary Examiner* — Sath V Perungavoor
*Assistant Examiner* — Shervin Nakhjavan
(74) *Attorney, Agent, or Firm* — Sunstein Kann Murphy & Timbers LLP (57) ABSTRACT

A liquid level detection method includes capturing an image of a liquid surface, a structural surface, and graduation markings provided on the structural surface using an image-capturing device to thereby obtain an initial image. Subsequently, the initial image is processed so as to generate a processed image, and a level reference value of the liquid surface is obtained from the processed image. The level reference value represents a height of the liquid surface in terms of inherent characteristics of the processed image. Lastly, a liquid level of the liquid surface is calculated based on a relative proportional relation among the level reference value, an overall height of the processed image in terms of the inherent characteristics of the processed image, and dimensions of any one of the initial and processed images relative to the graduation markings.

17 Claims, 8 Drawing Sheets

LIQUID LEVEL DETECTION METHOD

BACKGROUND OF THE INVENTION

1. Field of the Invention

The present invention relates to a liquid level detection method.

2. Description of the Related Art

Determining liquid levels in containers and in outside environments is an activity that is frequently performed. For example, chemistry experiments regularly involve mixing liquid chemicals in varying amounts. Accuracy in measuring the amounts of such liquid chemicals is extremely important. As another example, in a medical setting, it may be necessary to determine whether the liquid level in an intravenous container has reached a threshold line and needs refill or replacement. As to measuring liquid levels in outside environments, a common example is that related to determining the water level in a river or reservoir for flood control. That is, it may be necessary to determine the water level in a river or reservoir to facilitate flood control management.

There are two main techniques that are employed to determine liquid levels. One such technique involves visual observation, such as comparing the level of a liquid to graduation markings on a test tube, or comparing the level of water in a river to water level markings on a column of a bridge. The other technique involves the use of water level meters that employ buoys, pressure, or ultrasound.

However, there are several disadvantages to such conventional techniques in determining liquid levels as follows:

1. Visual observation is often inaccurate as a result of human error and inexperience. Furthermore, when measurements are conducted outside, it is inconvenient and may even be dangerous to dispatch personnel to flood-prone areas during a storm, typhoon, etc.

2. With respect to conventional equipment used outdoors to automatically detect water levels, installation and calibration of such equipment, which may be quite large, are not easy.

3. The conventional equipment used in outdoor settings is typically placed in contact with water. This not only leads to slow degradation of the equipment due to such constant contact with water, in flooding situations, the equipment may even be damaged as a result of being subjected to the forces generated by fast-flowing waters.

SUMMARY OF THE INVENTION

Therefore, the object of the present invention is to provide a liquid level detection method that operates based on image-processing techniques.

According to this invention, the liquid level detection method comprises capturing an image of a liquid surface, a structural surface, and graduation markings provided on the structural surface using an image-capturing device to thereby obtain an initial image. Subsequently, the initial image is processed so as to generate a processed image, and a level reference value of the liquid surface is obtained from the processed image. The level reference value represents a height of the liquid surface in terms of inherent characteristics of the processed image. Lastly, a liquid level of the liquid surface is calculated based on a relative proportional relation among the level reference value, an overall height of the processed image in terms of the inherent characteristics of the processed image, and dimensions of any one of the initial and processed images relative to the graduation markings.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

In the following description, a liquid level detection method and system according to a preferred embodiment of the present invention are described as being used to detect the water level in a river or reservoir. However, this is merely an example of an application of the present invention, and the liquid level detection method and system of the present invention may also be used to measure the liquid level in a container, such as a test tube or beaker utilized in a laboratory setting.

The liquid level detection method according to the preferred embodiment of the present invention will now be described with reference to FIGS. 1 and 2.

Figure 2:
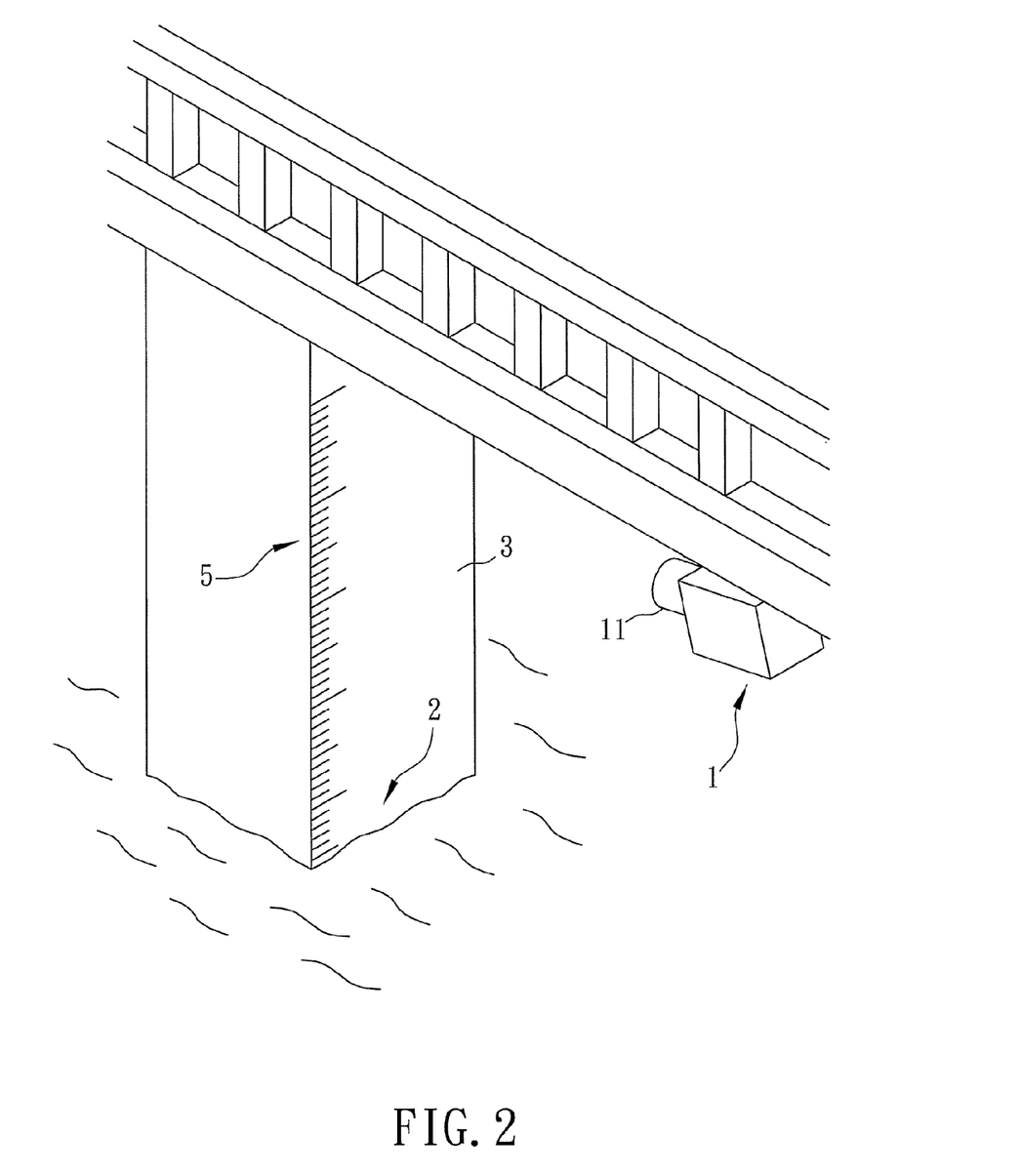
FIG. 2 is a schematic diagram, illustrating an example setting in which the liquid detection method of the preferred embodiment may be applied.
Figure 3:
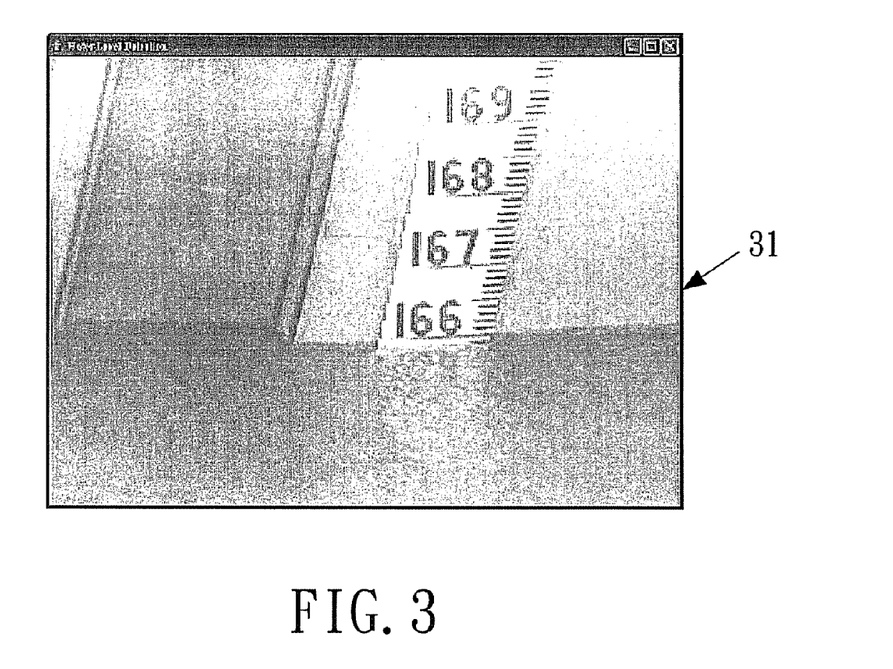
FIG. 3 is an initial image obtained by an image-capturing device, and which is to be processed in accordance with the liquid detection method of the preferred embodiment.

First, in step 41, an image-capturing device 1 having a lens 11 is used to capture an image of a liquid surface 2, a vertically extending structural surface 3 intersecting the liquid surface 2, and graduation markings 5 provided on the structural surface 3 to thereby obtain an initial image 31, as shown in FIG. 3.

It is to be noted that, in this embodiment, capture of the initial image 31 is conducted through a CCD (charge-coupled device) camera (i.e., the image-capturing device 1 is a CCD camera). A conventional CCD camera usually employs an interleaving scan. In such a camera, all horizontal scan lines are divided into an odd number region and an even number region according to the positions of the rows, and the odd number region and even number region are alternatingly scanned so as to form an entire frame. As a result, object shifting may occur, and to solve this problem, interpolation is often used. However, significant processing time by a processor is involved with such an operation. Therefore, in this embodiment, an AXIS® video server embedded system is used to convert analog image signals into digital image signals, so as to effectively increase processing speed. The image resolution may be either 704×480 or 320×240, and the image may be in a Motion JPEG (Joint Photographic Experts Group) digital image format. Hence, in the preferred embodiment, the captured initial image 31 is in a digital signal format.

Next, in step 42, the initial image 31 is processed so as to generate a processed image 36 (see FIG. 8), and a level reference value of the liquid surface 2 is obtained from the processed image 36. In this embodiment, the level reference value represents a height of the liquid surface 2 in terms of inherent characteristics of the processed image 36. An example of such inherent characteristics is provided hereinafter.

Figure 1:
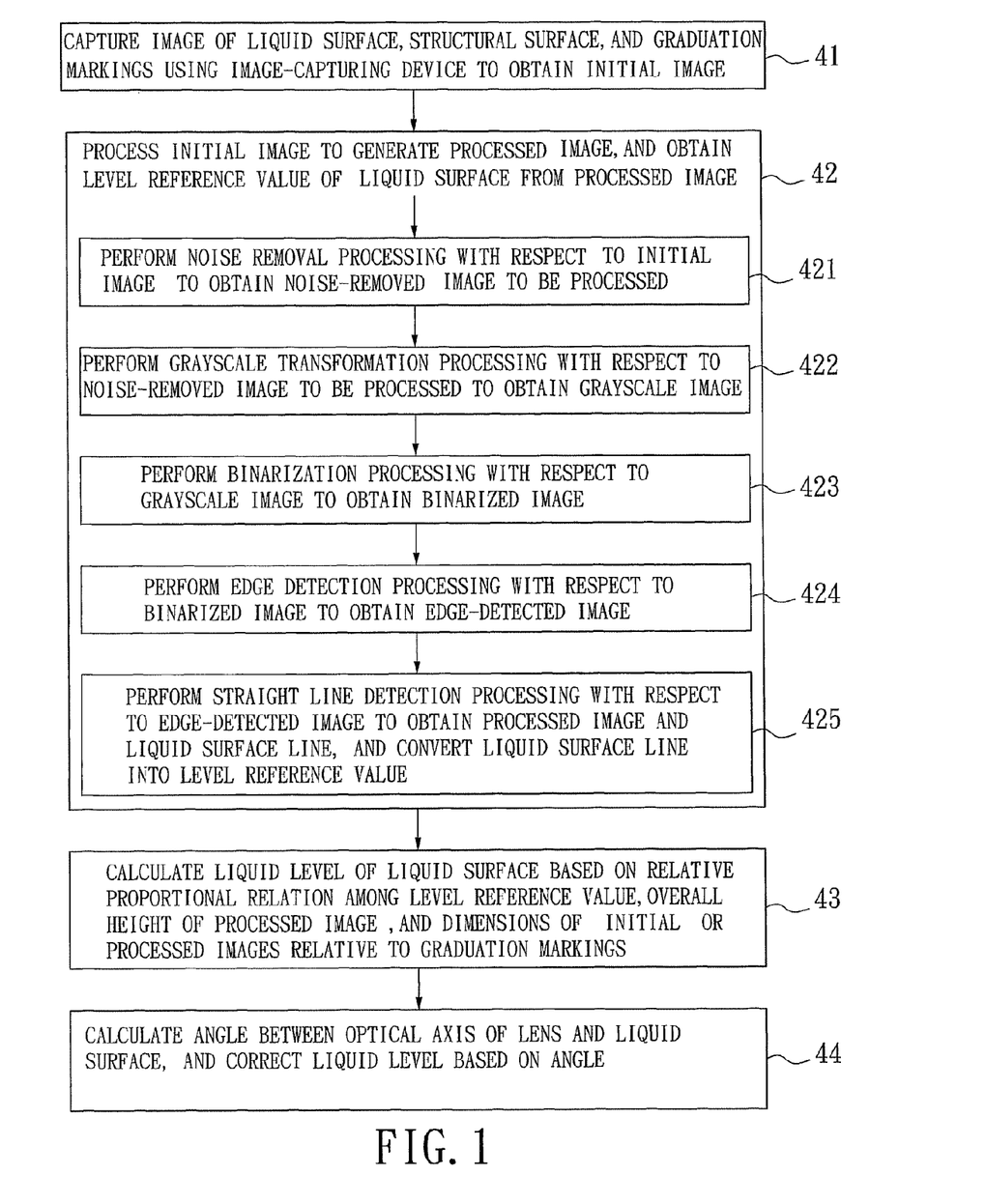
FIG. 1 is a flowchart of a liquid level detection method according to a preferred embodiment of the present invention.

As shown in FIG. 1, step 42 includes a plurality of sub-steps as outlined below.

Figure 4:
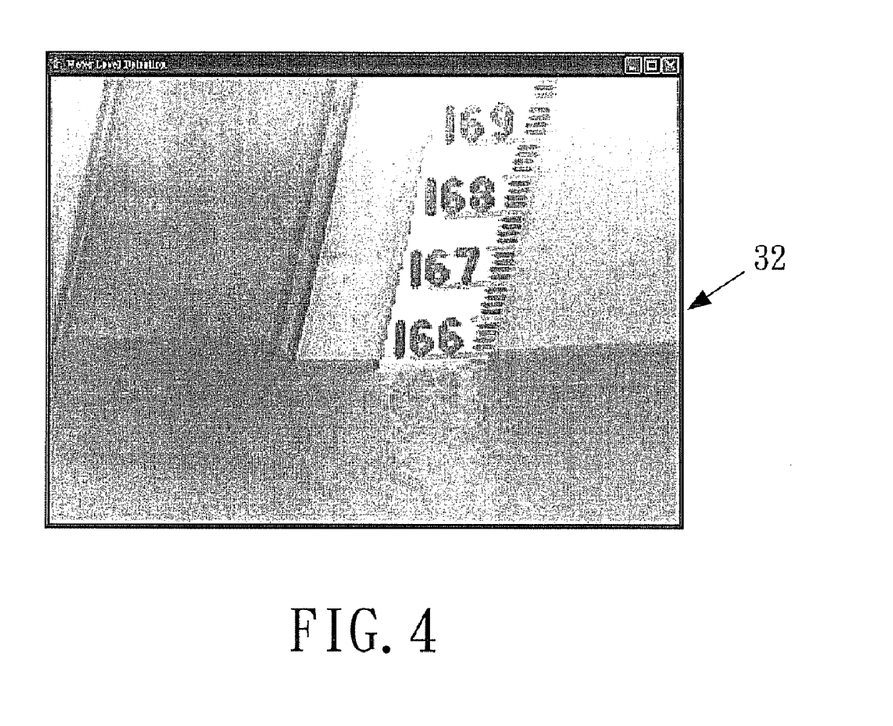
FIG. 4 is a noise-removed image to be processed which is obtained from the initial image according to the liquid detection method of the preferred embodiment.

In sub-step 421, noise removal processing is performed with respect to the initial image 31 to thereby obtain a noise-removed image to be processed 32, as shown in FIG. 4. In this embodiment, the noise removal processing involves performing integration with respect to the initial image 31 using a smooth filter so as to remove noise by a smoothing effect, thereby reducing the effect of errors caused by subsequent image processing.

Figure 5:
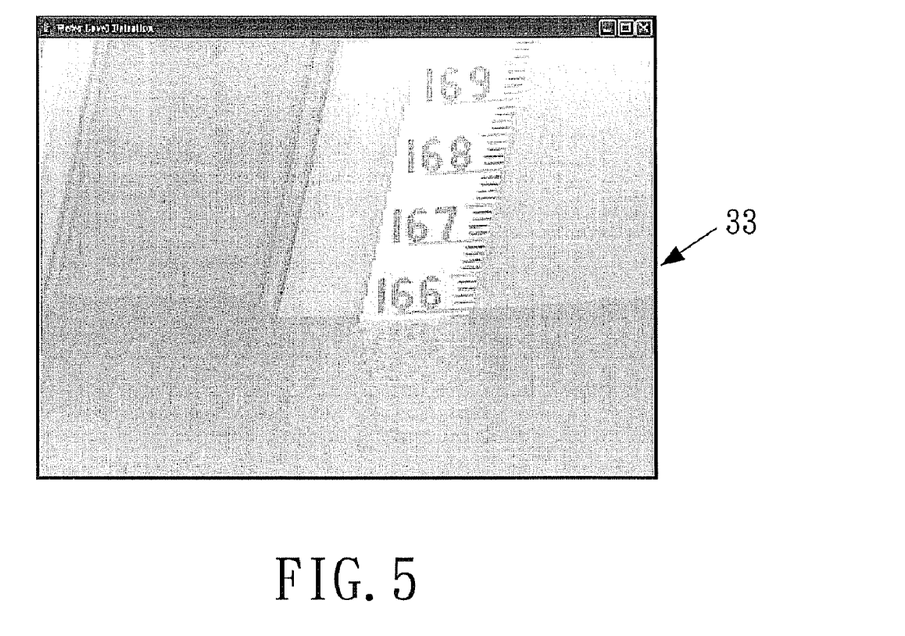
FIG. 5 is a grayscale image obtained from the noise-removed image according to the liquid detection method of the preferred embodiment.

Next, in sub-step 422, grayscale transformation processing is performed with respect to the noise-removed image to be processed 32 to thereby obtain a grayscale image 33, as shown in FIG. 5. In this embodiment, the grayscale transformation processing involves transforming the noise-removed image to be processed 32 into an image in a grayscale format to thereby obtain the grayscale image 33. Grayscale transformation processing is performed due to the large data sizes associated with color images.

Figure 6:
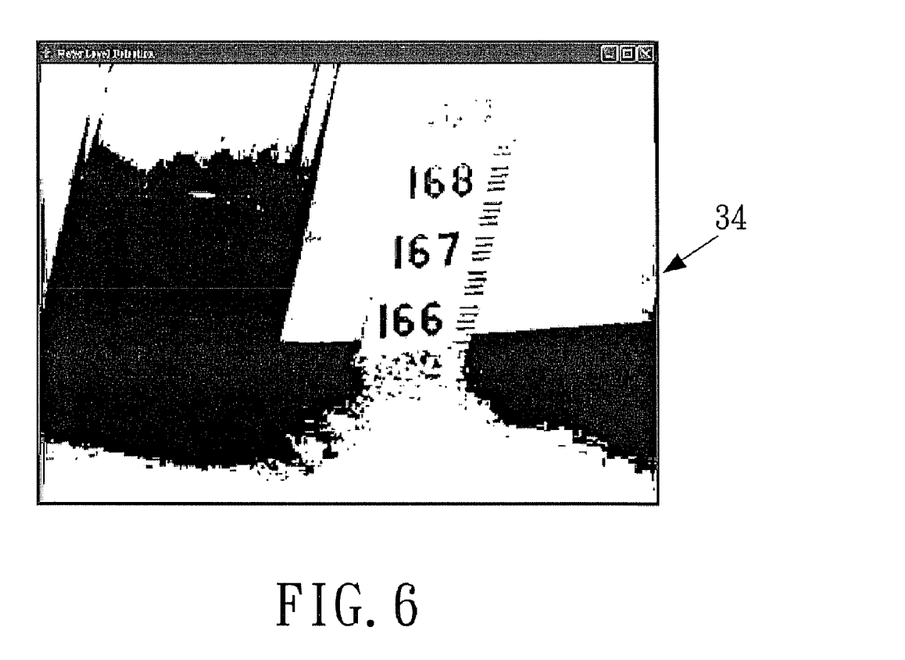
FIG. 6 is a binarized image obtained from the grayscale image according to the preferred embodiment.

Next, in sub-step 423, binarization processing is performed with respect to the grayscale image 33 so as to obtain a binarized image 34, as shown in FIG. 6. The binarized image 34 allows for higher processing efficiency and occupies less memory space. Furthermore, the image resulting from binarization processing (the binarized image 34 in this example) allows for better distinguishing between an object(s) and the background in such an image.

In this embodiment, the binarization processing involves setting each pixel in the grayscale image 33 that has a pixel value lower than a threshold value to a first color, and setting each pixel in the grayscale image 33 that has a pixel value not lower than the threshold value to a second color. In this embodiment, as shown in FIG. 6, the first color is black and the second color is white. Furthermore, in this embodiment, before generation of the binarized image 34, histogram frequency distribution processing is conducted, so that, during the binarization processing, the problem of differences in color levels caused by the influence of the environment, the picture-taking angle, and illumination during image capturing may be alleviated.

Figure 7:
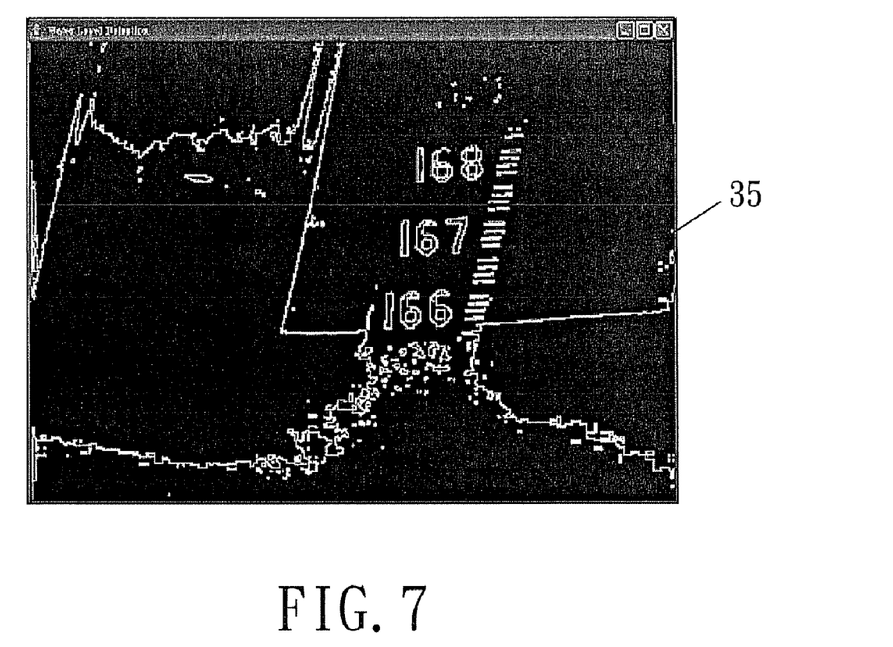
FIG. 7 is an edge-detected image obtained from the binarized image according to the liquid detection method of the preferred embodiment.

Next, in sub-step 424, edge detection processing is performed with respect to the binarized image 34 so as to obtain an edge-detected image 35, as shown in FIG. 7. The main purpose of edge detection processing is to find the boundaries between the object(s) and the background in an image. Most edge detection involves using differences in grayscale values of adjacent pixels in an image to detect edges. If a difference in grayscale values is large, then this indicates the presence of an edge, otherwise it may be determined that there is no edge present. However, in many instances, the edges are not formed by single pixels, and instead, may be formed by groups of pixels and the actual edge is present thereamong. This increases the difficulty in edge detection. Moreover, noise is another factor, which is generated randomly and therefore hard to predict. For these reasons, in this embodiment, edge detection processing involves use of a derivative filter to sharpen the binarized image 34.

In the next step, making use of the fact that the liquid surface 2 forms approximately a straight line, straight line detection is performed to find areas that may potentially be the liquid surface 2, and the remaining noise of surplus line segments that are unable to form straight lines is removed. In particular, in sub-step 425, straight line detection processing is performed with respect to the edge-detected image 35 so as to obtain the processed image 36 and a liquid surface line, which is indicated by the arrow in FIG. 8, and the liquid surface line is converted into the level reference value, which is indicated as 75 pixels in FIG. 9. The level reference value is described in greater detail below.

Figure 8:
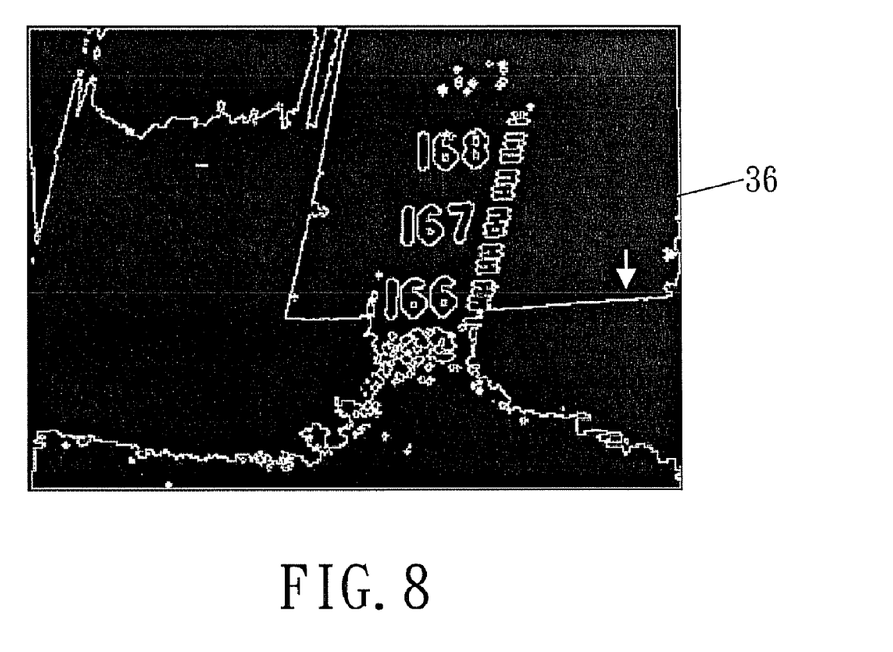
FIG. 8 is a processed image obtained from the edge-detected image according to the liquid detection method of the preferred embodiment.

The straight line detection processing involves removing noise of surplus line segments that do not form a straight line in the edge-detected image 35. Moreover, in this embodiment, the straight line detection processing involves utilization of the Hough transform technique to remove the noise of surplus line segments that do not form a straight line in the edge-detected image 35.

In the Hough transform technique, a straight line in an x-y coordinate plane is transformed into a point in a theta-rho coordinate plane, in which theta is the slope of the straight line in the x-y coordinate plane, and rho is the intercept of the straight line in the x-y coordinate plane. As an example, the two straight lines $y1=mx+b$ and $y2=ax+c$ in the x-y coordinate plane may be converted into two points (m, b) and (a, c) in the theta-rho coordinate plane. After Hough transformation, a large number of line segments will intersect to a point or form peaks at a vicinity thereof due to having the same slope and similar intercepts. As a result, a peak value derived by the Hough transform technique may be used to find the straight lines in the binarized image 34.

Next, in step 43, a liquid level of the liquid surface 2 is calculated based on a relative proportional relation among the level reference value, an overall height of the processed image 36 in terms of the inherent characteristics of the processed image 36, and dimensions of any one of the initial and processed images 31, 36 relative to the graduation markings 5.

In this embodiment, the overall height of the processed image 36 is a number of pixels along a vertical line between upper and lower boundaries of the processed image 36, and the level reference value is a number of pixels along the vertical line from the lower boundary of the processed image 36 to a representation of the liquid surface in the processed image 36 (i.e., to the liquid surface line).

Furthermore, in this embodiment, the dimensions of any one of the initial and processed images 31, 36 relative to the graduation markings 5 are given values, and are values of the graduation markings 5 corresponding respectively to the upper and lower boundaries of any one of the initial and processed images 31, 36. For example, an image may be captured in a low water state (or when a container is empty), and the graduation markings 5 corresponding to upper and lower boundaries of such an image may be obtained by visual observation. Since the upper and lower boundaries do not change, the values thus obtained are the same as the values of the graduation markings 5 corresponding to the upper and lower boundaries of any one of the initial and processed images 31, 36.

According to one embodiment, in step 43, the relative proportional relation used to calculate the liquid level of the liquid surface 2 involves interpolation using the level reference value, the overall height of the processed image 36, and the dimensions of any one of the initial and processed images 31, 36 relative to the graduation markings 5. For example, in this embodiment, the liquid level of the liquid surface 2 is calculated according to the following formula:

$$x+a(y-x),$$

where (x) is the value of the graduation marking 5 corresponding to the lower boundary of any one of the initial and processed images 31, 36, (y) is the value of the graduation marking 5 corresponding to the upper boundary of any one of the initial and processed images 31, 36, and (a) is a ratio of the level reference value to the overall height of the processed image 36.

Figure 9:
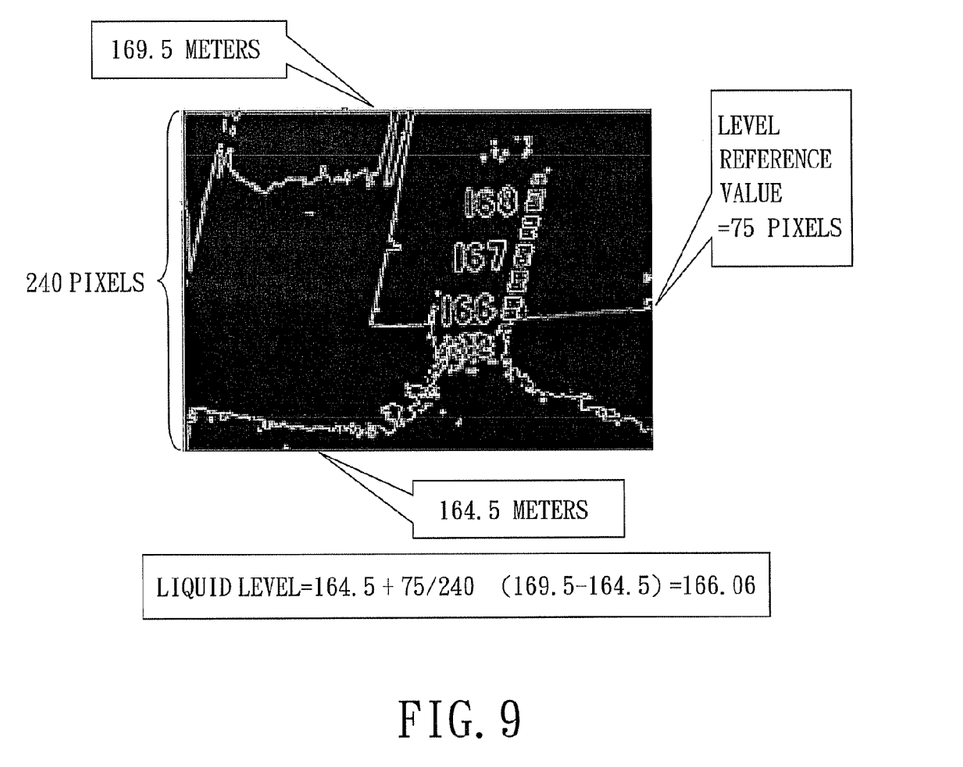
FIG. 9 shows the processed image, indicating various parameters that are pre-defined, or obtained through the liquid detection method of the preferred embodiment to calculate a liquid level.

Referring to FIG. 9, assuming a value of 164.5 meters for the graduation marking 5 corresponding to the lower boundary of the processed image 36, a value of 169.5 meters for the graduation marking 5 corresponding to the upper boundary of the processed image 36, a value of 75 pixels for the level reference value, and a value of 240 pixels for the overall height of the processed image 36, the liquid level of the liquid surface 2 may be calculated using the above formula as follows:

$$164.5+75/240(169.5-164.5)=166.06 \text{ meters}$$

Lastly, in step 44, an angle between an optical axis of the lens 11 of the image-capturing device 1 and the liquid surface 2 is calculated, and the liquid level of the liquid surface 2 calculated in step 43 is corrected based on the angle. In this embodiment, the correction of the liquid level is performed using a trigonometric function with respect to the angle between the optical axis of the lens 11 of the image-capturing device 1 and the liquid surface 2.

Figure 10:
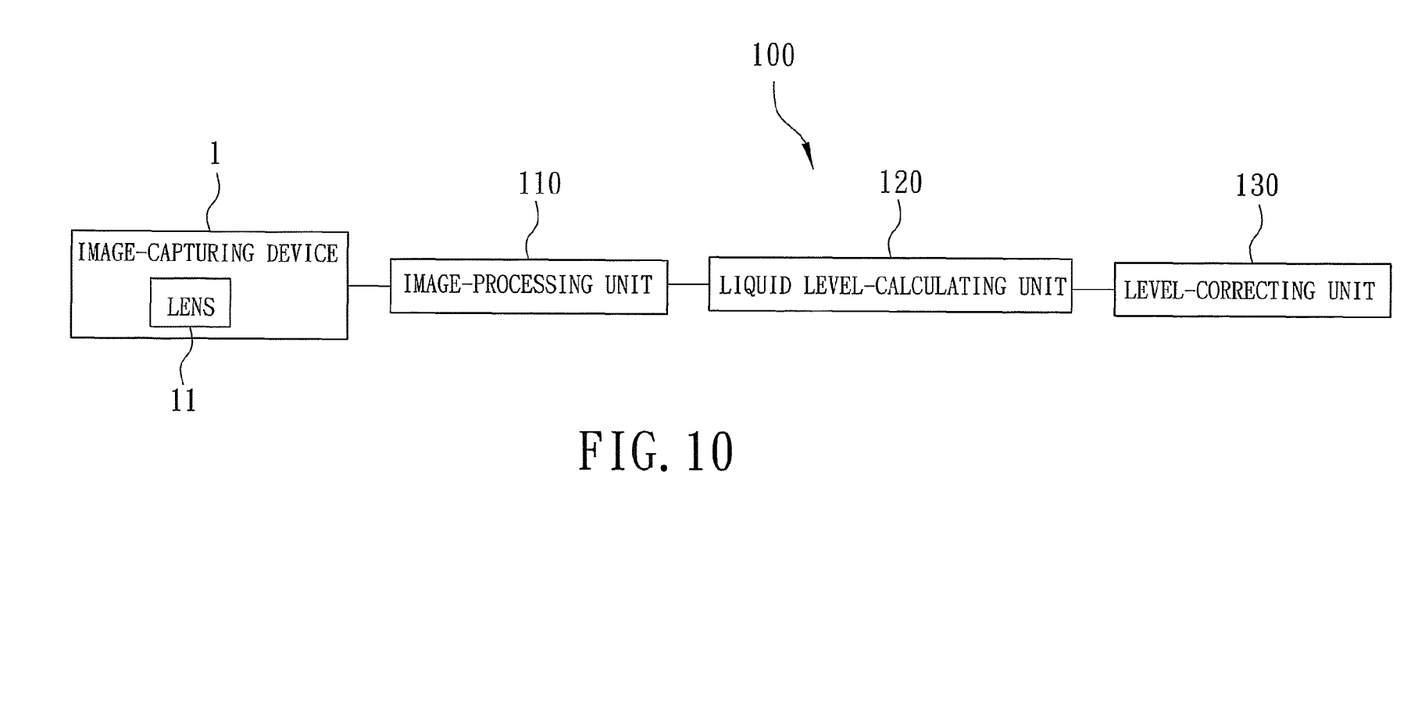
FIG. 10 is a schematic circuit block diagram of a liquid level detection system according to a preferred embodiment of the present invention.

Referring to FIG. 10, the liquid level detection system 100 according to a preferred embodiment of the present invention comprises the image-capturing device 1 having the lens 11, an image-processing unit 110 coupled to the image-capturing device 1, a liquid level-calculating unit 120 coupled to the image-processing unit 110, and a level-correcting unit 130 coupled to the liquid level-calculating unit 120.

The image-capturing device 1 captures an image of the liquid surface 2, the vertically extending structural surface 3 intersecting the liquid surface 2, and the graduation markings 5 provided on the structural surface 3 to thereby obtain the initial image 31, as shown in FIG. 3.

The image-processing unit 110 processes the initial image 31 so as to generate the processed image 36, as shown in FIG. 8, and obtains the level reference value of the liquid surface 2 from the processed image 36.

The liquid level-calculating unit 120 calculates the liquid level of the liquid surface 2 based on the relative proportional relation among the level reference value, the overall height of the processed image 36 in terms of inherent characteristics of the processed image 36, and dimensions of any one of the initial and processed images 31, 36 relative to the graduation markings 5.

The level-correcting unit 130 calculates the angle between the optical axis of the lens 11 of the image-capturing device 1 and the liquid surface 2, and corrects the liquid level of the liquid surface 2 calculated by the liquid level-calculating unit 120 based on the angle.

Figure 11:
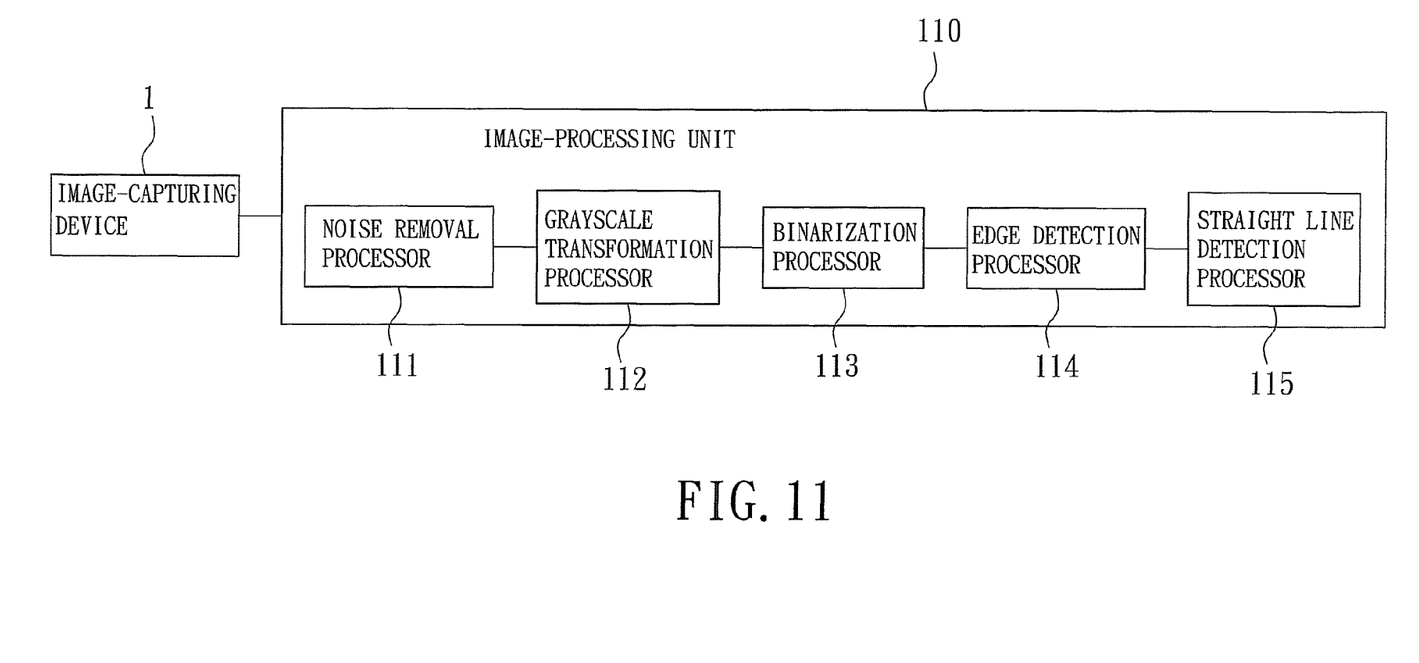
FIG. 11 is a schematic circuit block diagram of components of an image-processing unit in the liquid level detection system of the preferred embodiment.

In some embodiments, with reference to FIG. 11, a computer may be configured with proprietary software to result in the liquid level-calculating unit 120, the level-correcting unit 130, and the image-processing unit 110 having the following components: a noise removal processor 111 coupled to the image-capturing device 1 and for performing noise removal processing with respect to the initial image 31 to thereby obtain the noise-removed image to be processed 32; a grayscale transformation processor 112 coupled to the noise removal processor 111 and for performing grayscale transformation processing with respect to the noise-removed image to be processed 32 to thereby obtain the grayscale image 33; a binarization processor 113 coupled to the grayscale transformation processor 112 for performing binarization processing with respect to the grayscale image 33 so as to obtain the binarized image 34; an edge detection processor 114 coupled to the binarization processor 113 and for performing edge detection processing with respect to the binarized image 34 so as to obtain the edge-detected image 35; and a straight line detection processor 115 coupled to the edge detection processor 114 and for performing straight line detection processing with respect to the edge-detected image 35 so as to obtain the processed image 36 and the liquid surface line. The straight line detection processor 115 also converts the liquid surface line into the level reference value.

The liquid level detection method and system according to present invention have the following advantages:

1. Since the liquid level is calculated on the basis of a captured image and is not determined by visual observation, inaccuracies caused by human error and inexperience are avoided.

2. The only equipment that must be placed at the measurement site for the liquid level detection method and system of the present invention is the image-capturing device 1. Furthermore, the initial image 31 captured by the image-capturing device 1 may be obtained by the image-processing unit 110 via a wireless network. Finally, the image-capturing device 1 need not be made to any particular specification, and in fact, many commercially available cameras may be used. Hence, minimal installation and calibration, as well as high mobility are associated with the present invention.

3. Through use of images captured by the image-capturing device 1, there need not be any direct contact with the liquid being measured. Hence, there is no danger of degradation of equipment resulting from constant contact with liquids, nor of damage to equipment as a result of being subjected to forces generated by fast-flowing waters.

4. As a result of the processing performed in order to obtain the processed image 36 (i.e., the sub-steps of step 42), the complexity in calculating the level of the liquid surface 2 is reduced. Additionally, this allows for quick and accurate searching of information related to the processed image 36 after such information is stored in a database.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A liquid level detection method comprising:
   (a) capturing an image of a liquid surface, a structural surface, and graduation markings provided on the structural surface using an image-capturing device to thereby obtain an initial image;

(b) processing the initial image so as to generate a processed image, and obtaining a level reference value of the liquid surface from the processed image, the level reference value representing a height of the liquid surface in terms of inherent characteristics of the processed image; and (c) calculating a liquid level of the liquid surface based on a relative proportional relation among the level reference value, an over all height of the processed image in terms of the inherent characteristics of the processed image, and dimensions of any one of the initial and processed images relative to the graduation markings.

2. The liquid level detection method of claim 1, further comprising:

(d) determining an angle between an optical axis of a lens of the image-capturing device and the liquid surface, and correcting the liquid level of the liquid surface calculated in step (c) based on the angle.

3. The liquid level detection method of claim 2, wherein, in step (d), the correction of the liquid level is performed using a trigonometric function with respect to the angle between the optical axis of the lens of the image-capturing device and the liquid surface.

4. The liquid level detection method of claim 1, wherein the dimensions of any one of the initial and processed images relative to the graduation markings are given values, and are values of the graduation markings corresponding respectively to upper and lower boundaries of any one of the initial and processed images.

5. The liquid level detection method of claim 4, wherein, in step (c), the relative proportional relation used to calculate the liquid level of the liquid surface involves interpolation using the level reference value, the overall height of the processed image, and the dimensions of any one of the initial and processed images relative to the graduation markings.

6. The liquid level detection method of claim 5, wherein the overall height of the processed image is a number of pixels along a vertical line between the upper and lower boundaries of the processed image, and the level reference value is a number of pixels along the vertical line from the lower boundary of the processed image to a representation of the liquid surface in the processed image.

7. The liquid level detection method of claim 6, wherein, in step (c), the liquid level of the liquid surface is calculated according to the following formula:

$$x+a(y-x)$$

where (x) is the value of the graduation marking corresponding to the lower boundary of any one of the initial and processed images, (y) is the value of the graduation marking corresponding to the upper boundary of any one of the initial and processed images, and (a) is a ratio of the level reference value to the overall height of the processed image.

8. The liquid level detection method of claim 1, wherein said processing the initial image so as to generate the processed image of step (b) includes:

(b1) performing noise removal processing with respect to the initial image so as to obtain a noise-removed image to be processed;

(b2) performing grayscale transformation processing with respect to the noise-removed image to be processed so as to obtain a grayscale image;

(b3) performing binarization processing with respect to the grayscale image so as to obtain a binarized image;

(b4) performing edge detection processing with respect to the binarized image so as to obtain an edge-detected image; and (b5) performing straight line detection processing with respect to the edge-detected image so as to obtain the processed image and a liquid surface line, and converting the liquid surface line into the level reference value.

9. The liquid level detection method of claim 8, wherein, in step (b1), the noise removal processing involves performing integration with respect to the initial image using a smooth filter so as to remove noise.

10. The liquid level detection method of claim 8, wherein, in step (b2), the grayscale transformation processing involves transforming the noise-removed image to be processed into an image in a grayscale format to obtain the grayscale image.

11. The liquid level detection method of claim 8, wherein, in step (b3), the binarization processing involves setting each pixel in the grayscale image that has a pixel value lower than a threshold value to a first color, and setting each pixel in the grayscale image that has a pixel value not lower than the threshold value to a second color.

12. The liquid level detection method of claim 11, wherein, in step (b3), the first color is black and the second color is white, and before generation of the binarized image, histogram frequency distribution processing is conducted.

13. The liquid level detection method of claim 8, wherein, in step (b4), the edge detection processing involves using a derivative filter to sharpen the binarized image.

14. The liquid level detection method of claim 8, wherein, in step (b5), the straight line detection processing involves removing noise of surplus line segments that do not form a straight line in the edge-detected image.

15. The liquid level detection method of claim 14, wherein, in step (b5), the straight line detection processing involves utilization of the Hough transform technique to remove the noise of surplus line segments that do not form a straight line in the edge-detected image.

16. The liquid level detection method of claim 8, wherein the captured initial image is in a digital signal format.

17. The liquid level detection method of claim 1, wherein the structural surface is a vertically extending surface that intersects the liquid surface.

* * * * *